(12) United States Patent
Todd et al.

(10) Patent No.: US 11,840,130 B2
(45) Date of Patent: Dec. 12, 2023

(54) VEHICLE MOUNTED VIRTUAL VISOR SYSTEM WITH GRADIENT BLOCKING MODES

(71) Applicant: Robert Bosch GmbH, Stuttgart (DE)

(72) Inventors: Ryan Todd, Plymouth, MI (US); Jason Zink, Milford, MI (US); Andy Woodrich, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 174 days.

(21) Appl. No.: 17/343,882

(22) Filed: Jun. 10, 2021

(65) Prior Publication Data

US 2022/0396127 A1    Dec. 15, 2022

(51) Int. Cl.
| | | |
|---|---|---|
| *E06B 9/24* | (2006.01) | |
| *B60J 3/04* | (2006.01) | |
| *B60R 11/04* | (2006.01) | |
| *G06V 20/59* | (2022.01) | |
| *B60R 11/00* | (2006.01) | |

(52) U.S. Cl.
CPC .............. *B60J 3/04* (2013.01); *B60R 11/04* (2013.01); *E06B 9/24* (2013.01); *G06V 20/59* (2022.01); *B60R 2011/0035* (2013.01); *E06B 2009/2405* (2013.01); *E06B 2009/2464* (2013.01)

(58) Field of Classification Search
CPC ...... G06V 40/18; G06V 40/161; G06V 10/25; G06V 20/59; E06B 2009/2464; E06B 2009/2405; E06B 9/24; B60R 2011/0035; B60R 11/04; B60J 3/04

See application file for complete search history.

(56) References Cited

U.S. PATENT DOCUMENTS

| | | |
|---|---|---|
| 7,199,767 B2 | 4/2007 | Spero |
| 8,589,034 B2 | 11/2013 | Kwok |
| 9,108,492 B2 | 8/2015 | Kim et al. |
| 9,409,464 B2 | 8/2016 | Tomkins et al. |
| 10,699,651 B2 | 6/2020 | Todd et al. |
| 2010/0165099 A1 | 7/2010 | Marchthaler et al. |
| 2018/0096496 A1* | 4/2018 | Lobaugh ............... G06T 11/001 |
| 2018/0314092 A1 | 11/2018 | Todd et al. |
| 2019/0096340 A1* | 3/2019 | Todd ........................ G09G 3/36 |
| 2022/0283458 A1* | 9/2022 | Richards ............ G02F 1/13312 |

FOREIGN PATENT DOCUMENTS

| | | |
|---|---|---|
| DE | 10 2013 010 454 B4 | 5/2018 |
| EP | 1 654 133 B1 | 10/2009 |

\* cited by examiner

*Primary Examiner* — Mariam Qureshi
(74) *Attorney, Agent, or Firm* — Maginot, Moore & Beck LLP (57) ABSTRACT

A virtual visor system is disclosed that includes a visor having a plurality of independently operable pixels that are selectively operated with a variable opacity. A camera captures images of the face of a driver or other passenger and, based on the captured images, a controller operates the visor to automatically and selectively darken a limited portion thereof to block the sun or other illumination source from striking the eyes of the driver, while leaving the remainder of the visor transparent. The virtual visor system advantageously adopts a gradient blocking mode for the optical state of the visor that includes a blocker and a transition gradient, which has the effect of making updates to optical state of the visor less distracting. Additionally, the transition gradient in the optical state of the visor makes the virtual visor system more robust against errors in positioning the blocker on the visor.

11 Claims, 8 Drawing Sheets

VEHICLE MOUNTED VIRTUAL VISOR SYSTEM WITH GRADIENT BLOCKING MODES

FIELD

The device and method disclosed in this document relates to anti-glare systems and, more particularly, to vehicle mounted virtual visor system with gradient blocking modes.

BACKGROUND

Unless otherwise indicated herein, the materials described in this section are not admitted to be the prior art by inclusion in this section.

When driving an automotive vehicle while the sun is low on the horizon, such as in the mornings and evenings, a common problem is that the sun shines through the windshield and disrupts the view of the driver, making it challenging to clearly see the road, traffic signals, road signs, and other vehicles. A conventional solution to this problem is to include manually deployable sun visors mounted adjacent to the windshield of the vehicle. A sun visor is typically an opaque object which can be deployed between a passenger and the sun to block direct sunlight from striking the passenger's eyes. Particularly, the sun visor can be flipped, rotated, or otherwise repositioned to cover a portion of the windshield in an effort to block the sun.

However, in the deployed position, the sun visor generally fails to consistently and continuously prevent the sun from disrupting the view of the driver unless it is frequently adjusted. Particularly, due to its large size and distance from the earth, the sun acts as a directional light source. Thus, in order to block the sunlight, the sun visor must be positioned such that it intersects the subset of the sun's rays that would pass through the position of the driver's eyes. The correct positioning of the sun visor varies as a function of the position of the passenger's eyes and the direction of the sunlight relative to the passenger's eyes. During a typical driving trip in a vehicle, the vehicle generally changes directions frequently and the driver will move his or her head within the vehicle frequently. Accordingly, a sun visor must be repositioned or adjusted frequently to ensure continuous blockage of the sunlight.

In an effort to overcome these shortcomings, sun visors are typically much larger than is otherwise necessary to effectively block sunlight, such that a single position of the sun visor can block sunlight with a variety of head positions and sunlight directions, thereby reducing the required frequency of adjusting the sun visor. However, this larger size in turn obstructs the view of the driver, often blocking the view of high mounted road signs and stop lights. In order to overcome these issues, the driver often must reposition his or her head so that the visor blocks the sun, while not overly disrupting the rest of his or her view.

What is needed is a visor system which reliably blocks high intensity light sources, such as the sun, while minimizing distraction of the driver and disruption to the rest of the view of the driver through the windshield.

SUMMARY

A visor system is disclosed. The visor system comprises a camera mounted within an environment and configured to capture a plurality of images of a face of a person in the environment. The visor system further comprises a visor mounted within the environment and having a plurality of pixels arranged contiguously. An optical state of the visor is adjustable by selectively operating each respective pixel of the plurality of pixels with a respective pixel optical state selected from a plurality of pixel optical states. Each pixel optical state in the plurality of pixel optical states has a different opacity such that the respective pixel blocks a different amount of light from passing through a corresponding area of the visor. The visor system further comprises a controller operably connected to the camera and to the visor. The controller is configured to receive the plurality of images from the camera. The controller is further configured to, for each respective image in the plurality of images, determine, based on the respective image, at least one position on the visor at which a light source shines through the visor into an eye of the person. The controller is further configured to, for each respective image in the plurality of images, determine, based on the at least one position on the visor, an updated optical state for the visor to block the light source from shining through the visor into the eye of the person, the updated optical state including a subset of pixels operated in different pixel optical states that define a gradient of opacities. The controller is further configured to, for each respective image in the plurality of images, operate the visor to display the updated optical state.

A method for operating a visor system is disclosed. The visor system includes a visor mounted within an environment and having a plurality of pixels arranged contiguously, an optical state of the visor is adjustable by selectively operating each respective pixel of the plurality of pixels with a respective pixel optical state selected from a plurality of pixel optical states. Each pixel optical state in the plurality of pixel optical states has a different opacity such that the respective pixel blocks a different amount of light from passing through a corresponding area of the visor. The method comprises capturing, with a camera mounted within the environment, a plurality of images of a face of a person in the environment. The method further comprises, for each respective image in the plurality of images, determining, with a controller, based on the respective image, at least one position on the visor at which a light source shines through the visor into an eye of the person. The method further comprises, for each respective image in the plurality of images, determining, with the controller, based on the at least one position on the visor, an updated optical state for the visor to block the light source from shining through the visor into the eye of the person, the updated optical state including a subset of pixels operated in different pixel optical states that define a gradient of opacities. The method further comprises, for each respective image in the plurality of images, displaying, with the visor, the updated optical state.

A non-transitory computer-readable medium for operating a visor system is disclosed. The visor system includes a camera mounted within an environment and configured to capture a plurality of images of a face of a person of the environment. The visor system further includes a visor mounted within the environment and having a plurality of pixels arranged contiguously, an optical state of the visor is adjustable by selectively operating each respective pixel of the plurality of pixels with a respective pixel optical state selected from a plurality of pixel optical states. Each pixel optical state in the plurality of pixel optical states has a different opacity such that the respective pixel blocks a different amount of light from passing through a corresponding area of the visor. The computer-readable medium stores program instructions that, when executed by a processor, cause the processor to receive the plurality of images from the camera. The computer-readable medium further stores program instructions that, when executed by a processor, cause the processor to, for each respective image in the plurality of images, determine, based on the respective image, at least one position on the visor at which a light source shines through the visor into an eye of the person. The computer-readable medium further stores program instructions that, when executed by a processor, cause the processor to, for each respective image in the plurality of images, determine, based on the at least one position on the visor, an updated optical state for the visor to block the light source from shining through the visor into the eye of the person, the updated optical state including a subset of pixels operated in different pixel optical states that define a gradient of opacities. The computer-readable medium further stores program instructions that, when executed by a processor, cause the processor to, for each respective image in the plurality of images, operate the visor to display the updated optical state.

BRIEF DESCRIPTION OF THE DRAWINGS

The foregoing aspects and other features of visor system and method are explained in the following description, taken in connection with the accompanying drawings.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Virtual Visor System

Figure 1:
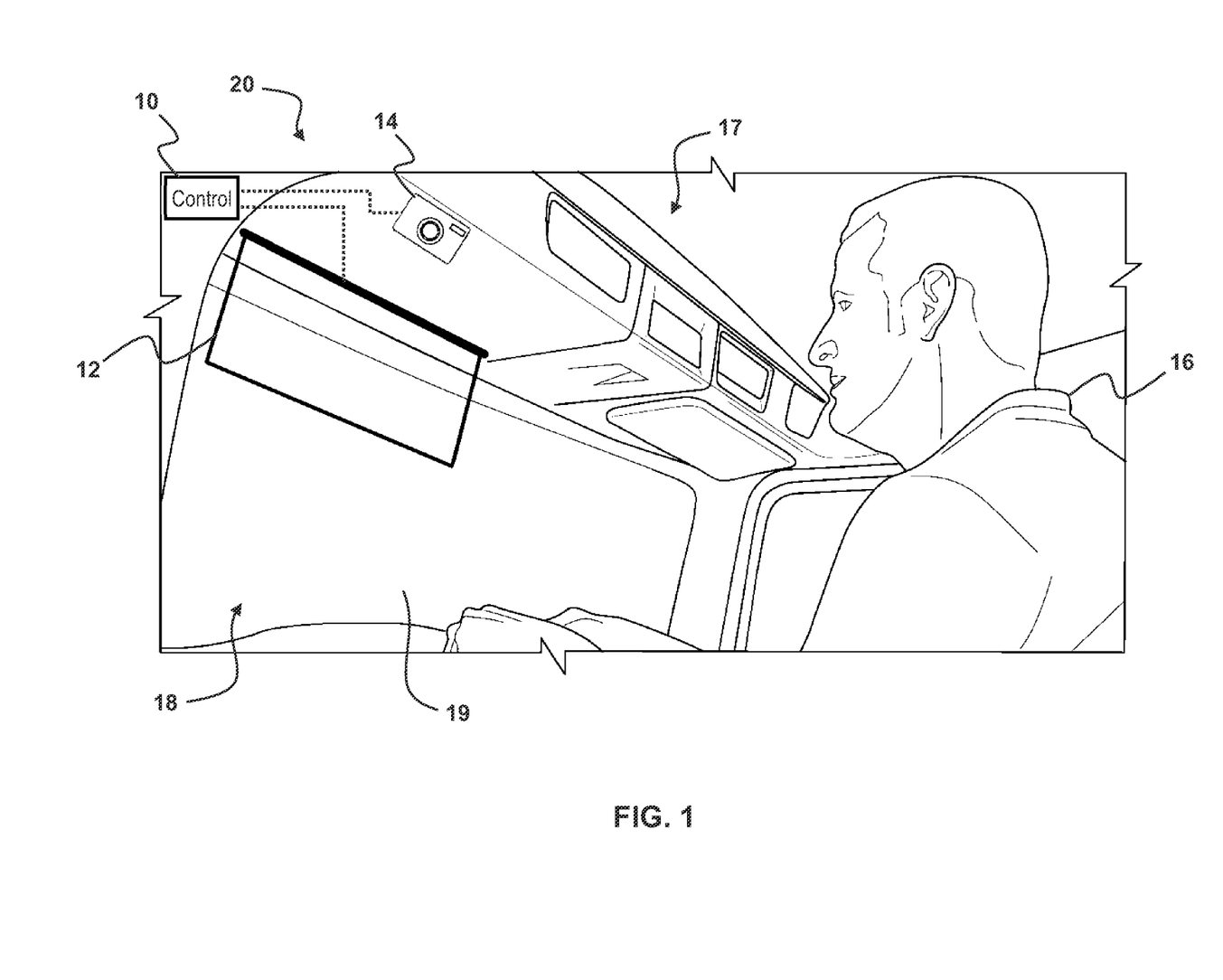
FIG. 1 is a side view of a portion of a driver compartment of a vehicle showing an exemplary embodiment of a vehicle mounted virtual visor system.

With reference to FIG. 1, an exemplary embodiment of a vehicle mounted virtual visor system 20 is described. Particularly, FIG. 1 shows a partial view of a cabin 17 and windshield 19 of a vehicle 18 in which the virtual visor system 20 is installed. The vehicle 18 may be a passenger vehicle, a commercial vehicle, an off-road vehicle, a recreational vehicle, an airplane, a boat, or any other suitable vehicle. It should be appreciated, however, that the virtual visor system 20 may also be used in environments other than a vehicle, such as a room of a building (e.g., an office environment or manufacturing setting). The virtual visor system 20 at least includes a controller 10, a visor 12, and a camera 14. The visor 12 comprises a plurality of independently operable regions, referred to herein as "pixels," that can be selectively operated with a variable opacity/transparency. The camera 14 captures images of the face of a driver 16 or other passenger and, based on the captured images, the controller 10 operates the visor 12 to automatically and selectively darken a limited portion thereof to block the sun or other illumination source from striking the eyes of the driver 16, while leaving the remainder of the visor 12 transparent. Thus, the virtual visor system 20 advantageously eliminates unnecessary obstructions to the drivers view while also blocking distracting light sources, thereby improving the safety of the vehicle 18 by minimizing disruption of the view of the driver.

In at least some embodiments, the visor 12 is mounted or otherwise attached to a surface within the cabin 17 of the vehicle 18, in the field of view of the driver 16 or other passenger. Particularly, in some embodiments, the visor 12 is mounted to the vehicle 18 so as to be in the line of sight of the driver 16 sitting in the driver's seat and looking through the windshield 19. For example, in the case of a left-hand drive vehicle, the visor 12 may be mounted to the roof adjacent to the windshield 19 so as to cover and/or obstruct at least a portion of an upper-left (as viewed from within the cabin 17) region of the windshield 19. Conversely, in the case of a right-hand drive vehicle, the visor 12 may be mounted to the roof adjacent to the windshield 19 so as to cover and/or obstruct at least a portion of an upper-right (as viewed from within the cabin 17) region of the windshield 19. The visor 12 may be proportioned, mounted, and arranged to cover and/or obstruct any region or regions of the windshield 19, as well as regions of other windows of the vehicle 18. As further examples, the visor 12 may be mounted to any of the pillars of the vehicle 18 adjacent to the windshield 19 or other window, mounted to the dash, or mounted directly to the windshield 19 other window itself in order to cover different regions of the windshield 19 or other windows of the vehicle 18. In some embodiments, the visor 12 may by hingedly or pivotally mounted to an interior surface of the vehicle 18 such that its orientation can be manually adjusted. Alternatively, in some embodiments, the visor 12 is integrated with the glass of the windshield 19 or other window of the vehicle.

Figure 2:
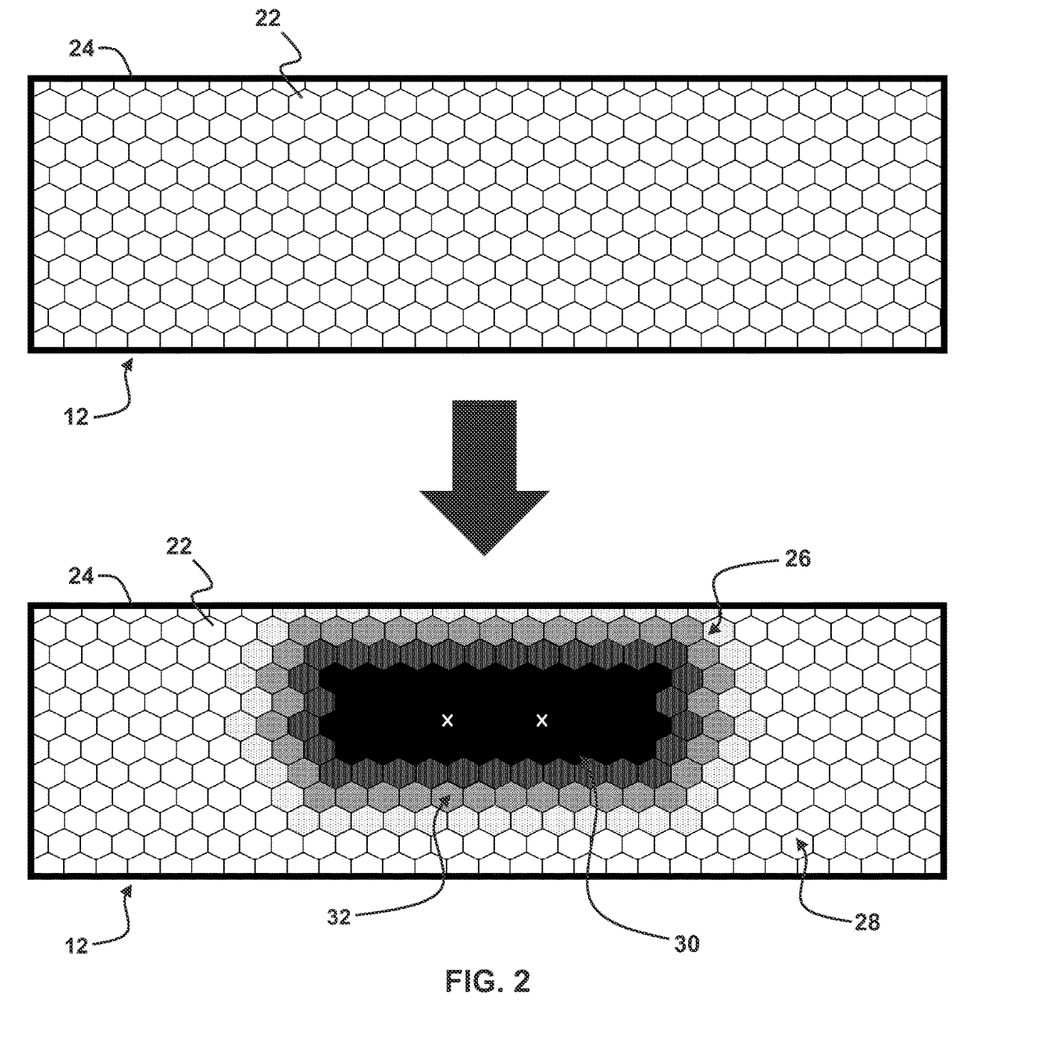
FIG. 2 shows an exemplary embodiment of the visor of FIG. 1 operated in a first exemplary gradient blocking mode.

With reference to FIG. 2, the visor 12 comprises a plurality of independently operable pixels 22 that are contiguously arranged to form a panel. As used herein, the term "pixel" refers to any independently operable portion of a medium that is controllable to adjust an optical transparency thereof. In at least some embodiments, the plurality of pixels 22 are contiguously arranged within a bezel 24. In the illustrated embodiment, the pixels 22 each have a hexagonal shape and are arranged in a uniform grid formation. However, it should be appreciated that the pixels 22 may be of any size and shape and the visor 12 may include non-uniform arrangements of pixels 22 having mixed sizes and shapes. In at least one embodiment, the visor 12 is an LCD panel having LCD pixels 22. However, it should be appreciated that the visor 12 may instead utilize various other technologies in which portions of the visor 12 are electrically, magnetically, or mechanically controllable to adjust an optical transparency thereof.

In order to block sunlight from striking the eyes of the driver 16, a subset of pixels 26 are operated in an at least partially opaque optical state, whereas the remaining pixels 28 are operated in a transparent optical state. Particularly, each pixel 22 is configured to be selectively operated by the controller 10 in a plurality of pixel optical states including: (1) a transparent optical state in which the respective pixel allows light to pass through a respective area of the visor 12, (2) an opaque optical state in which the respective pixel blocks light from passing through the respective area of the visor 12, and (3) one or more intermediate optical states in which the respective pixel partially blocks different amounts of light from passing through the respective area of the visor 12. It should be appreciated that the "opaque optical state" and a "transparent optical state" do not necessarily indicate a 100% opaque characteristic and a 100% transparent characteristic, respectively. Instead, the opaque optical state is simply an optical state in which the pixel which blocks more light from passing through the respective area than the pixel does in the transparent optical state. Generally, the opaque optical state blocks the most light from passing through the respective area and the transparent optical state blocks the least light from passing through the respective area.

In the illustrated embodiment, a first exemplary gradient blocking mode defines a blocker subset of pixels 30 that are operated in a most opaque pixel optical state (which is also referred to herein as simply the "blocker" of the optical state of the visor 12) and a transition gradient subset of pixels 32 (which is also referred to herein as the "transition gradient" of the optical state of the visor 12). The blocker 30 is positioned such that it encompasses a projected eye positions on the visor 12 and, thus, blocks sunlight from passing through the visor 12 and striking the eyes of the driver 16 or other passenger. As will be described in further detail below, the virtual visor system 20 may be configured to operate using a variety different gradient blocking modes, each blocking mode generally having a different style of blocker 30 and a different style of transition gradient 32.

Returning to FIG. 1, the controller 10 generally comprises at least one processor and at least one associated memory having program instructions stored thereon, which are executed by the at least one processor to achieve the described functionalities. It will be recognized by those of ordinary skill in the art that a "controller" or "processor" includes any hardware system, hardware mechanism or hardware component that processes data, signals, or other information. The controller 10 may include a system with a central processing unit, multiple processing units, or dedicated circuitry for achieving specific functionality.

In at least one embodiment, the controller 10 is operably connected to one or more row/column driver circuits (not shown), via which the controller 10 controls the optical state of each individual pixel of the visor 12. The row/column driver circuits may comprise any suitable arrangement of multiplexers, transistors, amplifiers, capacitors, etc. configured to control the optical state of each individual pixel of the visor 12 in response to control signals provided by the controller 10. In some embodiments, portions of the row/column driver circuits may be integrated with the visor 12 and the pixels thereof. In some embodiments, portions of the row/column driver circuits may be integrated with the controller 10.

With continued reference to FIG. 1, the camera 14 continuously or periodically captures images of the face of the driver 16 or other passenger in the cabin 17 of the vehicle 18. The camera 14 is mounted in the vehicle 18 at a location which has a clear view of at least part of the face of the driver 16 so as to detect a shadow cast on the face of the driver 16. In the illustrated embodiment, the camera 14 is mounted or otherwise integrated with the roof of the vehicle 18, above the windshield 19 and directly in front of the driver 16. In another embodiment, the camera 14 is mounted to or otherwise integrated with the dash or steering wheel directly in front of the driver 16. In yet another embodiment, the camera 14 integrated with visor 12, such as in the bezel 24. In a further embodiment, the camera 14 is mounted to or otherwise integrated with the left or right "A" pillar of the vehicle 18.

Figure 3:
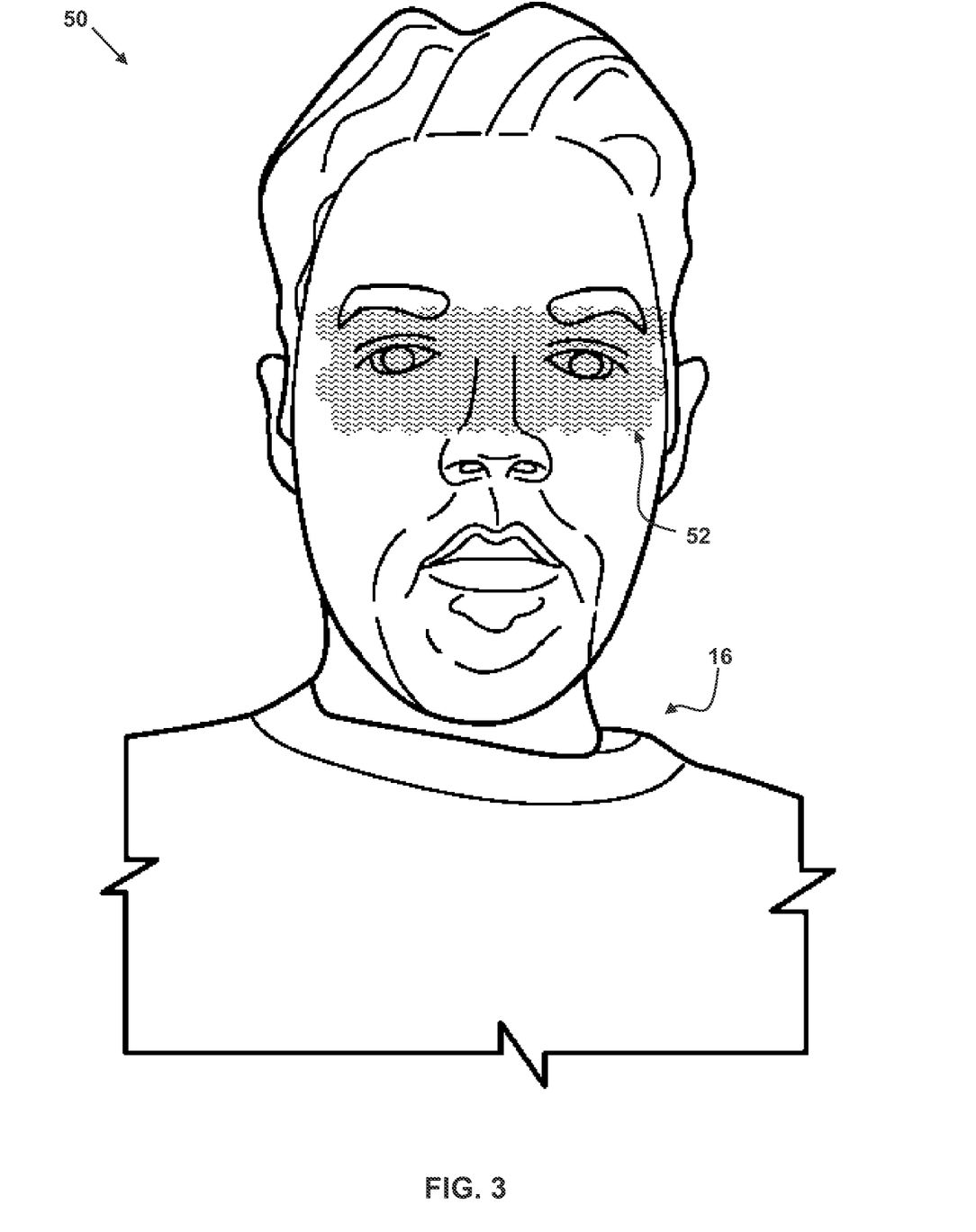
FIG. 3 shows a portion of an exemplary image of the face of the driver captured by the camera of FIG. 1.

FIG. 3 shows a portion of an exemplary image 50 of the face of the driver 16 or other passenger. As can be seen, a shadow 52 is projected onto the face of the driver 16 or other passenger by the optical state of the visor 12. In particular, the shadow 52 corresponds to a projection of the subset of pixels 26 that are operated in the at least partially opaque optical state. The controller 10 is configured to receive the images of the face of the driver 16 or other passenger from the camera 14 and, based on the images, continuously update the optical state of the visor 12. In particular, the controller 10 determines and continuously updates a sunlight direction based on the location of the detected shadow 52 on the face of the driver 16 or other passenger. Additionally the controller 10 determines and continuously updates positions of the eyes of the driver 16 or other passenger within the cabin 17, based on the images. Based on the sunlight direction and the positions of the eyes of the driver 16 or other passenger, the controller 10 updates the subset of pixels 26 that are operated in the at least partially opaque optical state so that the sunlight continues to be blocked from striking the eyes of the driver 16 or other passenger.

It should be appreciated that, both the sunlight direction and the positions of the eyes of the driver 16 or other passenger will change frequently, and sometimes rapidly, as the vehicle 18 is driven. Depending on strategy adopted by the controller 10 for determining and updating the optical state of the visor 12, this may result in equally frequent and rapid changes in the optical state of the visor 12. However, frequent and rapid changes in the optical state of the visor 12 create a visual disturbance that can be distracting to the driver 16. Accordingly, it is advantageous for the controller 10 to adopt one or more strategies to minimize the amount and the extent of these visual disturbances.

Method of Operating the Virtual Visor System

A variety of methods and processes are described below for operating the virtual visor system 20. In these descriptions, statements that a method, processor, and/or system is performing some task or function refers to a controller or processor (e.g., the processor of the controller 10) executing program instructions stored in non-transitory computer readable storage media (e.g., the memory of the controller 10) operatively connected to the controller or processor to manipulate data or to operate one or more components in the virtual visor system 20 to perform the task or function. Additionally, the steps of the methods may be performed in any feasible chronological order, regardless of the order shown in the figures or the order in which the steps are described.

Figure 4:
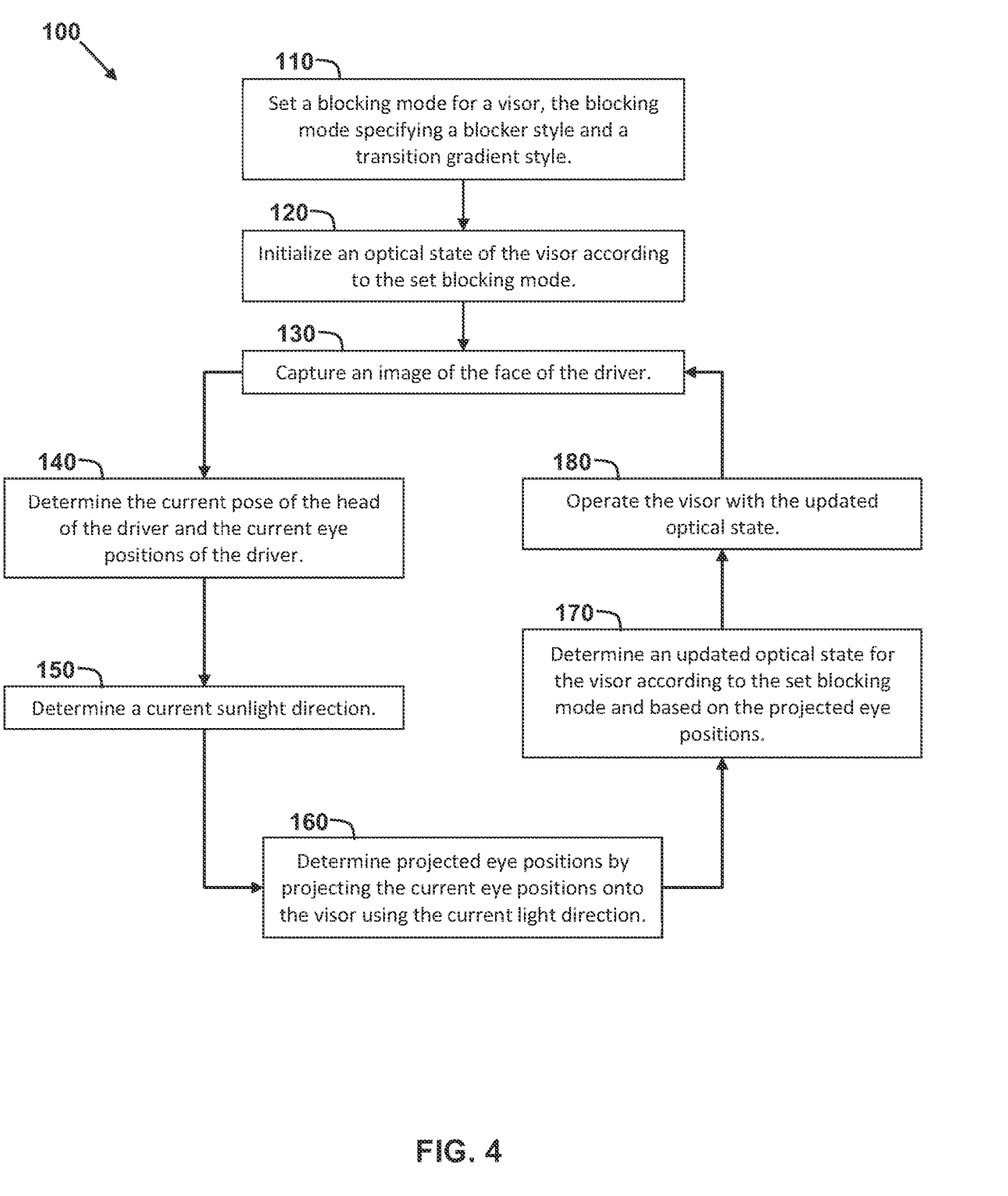
FIG. 4 shows a method for controlling an optical state of the visor to continuously block sunlight from striking the eyes of the driver or other passenger, while minimizing the visual disturbance of updates to the optical state.

FIG. 4 shows a method 100 for controlling an optical state of the visor 12 to continuously block sunlight from striking the eyes of the driver 16 or other passenger, while minimizing the visual disturbance of updates to the optical state. The method 100 advantageously adopts a gradient blocking mode for the optical state of the visor 12 that includes a blocker and a transition gradient, which has the effect of making updates to optical state of the visor 12 less distracting. Additionally, the transition gradient in the optical state of the visor 12 makes the virtual visor system 20 more robust against errors in positioning the blocker on the visor 12.

Although described primarily with respect to blocking sunlight from striking the eyes of the driver 16, it should be appreciated that the method 100 is equally applicable to blocking sunlight from striking the eyes of other passengers in the vehicle 18. Additionally, although described primarily with respect to sunlight, it should be appreciated that the method 100 is equally applicable to blocking light from any other light source, including multiple light sources (e.g., oncoming vehicle headlights).

The method 100 begins with setting a blocking mode for a visor, the blocking mode specifying a blocker style and a transition gradient style (block 110). Particularly, the controller 10 sets and/or determines a blocking mode that is to be used for operating the visor 12, which generally specifies a style, size, or pattern for a blocker (e.g., the blocker 30) and a style, size or pattern for a transition gradient (e.g., the transition gradient 32). As detailed below, the controller 10 operates the visor 12 with an optical state that depends on the particular blocking mode of the virtual visor system 20 and the driving conditions of the vehicle 12. In some embodiments, the controller 10 reads at least one parameter characterizing at least one aspect of the blocking mode (e.g., style, size, or pattern of the blocker or transition gradient) from a memory, for example at startup of the virtual visor system 20, which was previously stored in the memory. In some embodiments, the controller 10 receives a user selection for at least one parameter characterizing at least one aspect of the blocking mode (e.g., style, size, or pattern of the blocker or transition gradient) from a user, such as the driver 16 or other passenger, via a user interface. Based on the user selection, the controller 10 updates the at least one parameter by storing the newly selected parameter(s) in the memory.

As used herein, the "optical state" of the visor 12 refers to the collective pixel optical states of all of the pixels 22 of the visor 12. Likewise, as used herein, the "pixel optical state" refers to the operating state of an individual one of the pixels 22 of the visor 12. In at least some embodiments, the optical state of the visor 12 is characterized by an array of integer values in which each integer value indicates a respective pixel optical state $O_i$ of a respective pixel i. In embodiments in which the pixels 22 of the visor 12 are arranged in a uniform grid formation having a plurality of m columns and a plurality of n rows, the optical state of the visor 12 is characterized in particular by an [m×n] array of integer values $O_{i,j}$, each representing the pixel optical state of a respective pixel at the location (i, j). In at least one embodiment, the integer values have a value selected from a predetermined range of values (e.g., 0-255) corresponding to a plurality of possible pixel optical states (e.g., where 0 indicates a most transparent pixel optical state, 255 indicates a most opaque pixel optical state, and the intermediate values indicate intermediate opacities therebetween).

Additionally, as used herein, a "blocking mode" refers to the manner in which the optical state of the visor 12 and/or the pixel optical states of the individual pixels 22 of the visor 12 are determined as a function of the driving conditions of the vehicle 12. In the particular embodiments described herein, the driving conditions of the vehicle 12 are characterized by the sunlight direction and the positions of the eyes of the driver 16 or other passenger. As discussed below, the positions of the eyes is projected onto the visor 12 using the sunlight direction and, thus, the projected eye positions equivalently characterize the driving conditions of the vehicle 12. In at least some embodiments, the blocking mode defines how the optical state of the visor 12 and/or the pixel optical states of the individual pixels 22 of the visor 12 are determined as a function of the projected eye positions on the visor 12.

The blocking modes described herein are, in particular, gradient blocking modes that include a gradient of opacities. Particularly, each gradient blocking mode includes subset of pixels that are operated with different pixel optical states so as to define a gradient of opacities. More particularly, in at least some embodiments, the optical states of the gradient blocking modes include (i) a first subset of pixels, referred to as the "blocker," which are operated in a first pixel optical state having a first opacity (e.g., the most opaque pixel optical state) and (ii) a second subset of pixels, referred to as the "transition gradient," which are operated in set of second pixel optical states having opacities that are less opaque than the first opacity (e.g., a variety of semi-transparent pixel optical state) and which define a gradient of opacities. As used herein, a "gradient of opacities" refers to a portion of the optical state of the visor 12 in which the opacity of the pixels 22 increases or decreases over a physical distance along the surface of the visor 12. It should be appreciated that these increases or decreases of the opacity of the pixels 22 may be linear or non-linear with respect to the physical distance along the surface of the visor 12

In at least some embodiments, the blocker includes at least one contiguous grouping of the pixels 22 that is arranged on the visor 12 so as to encompass the projected eye positions, thereby blocking sunlight from passing through the visor 12 and striking the eyes of the driver 16 or other passenger. In at least some embodiments, the transition gradient includes at least one contiguous grouping of the pixels 22 arranged along at least a portion of a perimeter of the blocker. In this way, the transition gradient visually softens the perimeter (or edge) of the blocker such that updates and/or movements of the blocker are less distracting.

With reference to FIG. 2, a first exemplary gradient blocking mode has already been described. Particularly, in the example of FIG. 2, a first subset of pixels forms a blocker 30 and a second subset of pixels forms a transition gradient 32. The blocker 30 is positioned such that it encompasses the projected eye positions (shown as 'x' markings within the blocker 30) on the visor 12 and the pixels thereof are operated in a most opaque pixel optical state. In this way, the opaque pixels of the blocker 30 block sunlight from passing through the visor 12 and striking the eyes of the driver 16 or other passenger. The transition gradient 32 is arranged around the perimeter of the blocker 30 and the subset of pixels thereof are operated in a variety of different intermediate semi-opaque pixel optical states that define gradient of opacities in directions extending away from the blocker 30 and/or extending away from the projected eye positions.

In the illustrated embodiment, the blocker 30 has a generally rectangular contiguous shape formed by four rows have a width of nine or ten pixels. However, different blocking modes may include a variety of differently shaped or patterned blockers 30. Likewise, in the illustrated embodiment, the transition gradient 32 includes pixels surrounding the blocker 30 having opacities that depend on a distance from the blocker 30 and/or a distance from the projected eye positions on the visor 12. In particular, the pixels of the transition gradient 32 have progressively decreasing opacities with increased distance from the perimeter of blocker 30, such that the pixels of the transition gradient 32 that are relatively closer to the blocker 30 and/or the projected eye positions are more opaque than the pixels of the transition gradient 32 that are relatively further to the blocker 30 and/or the projected eye positions. However, different blocking modes may include a variety of differently shaped or patterned transition gradients 32.

Figure 5:
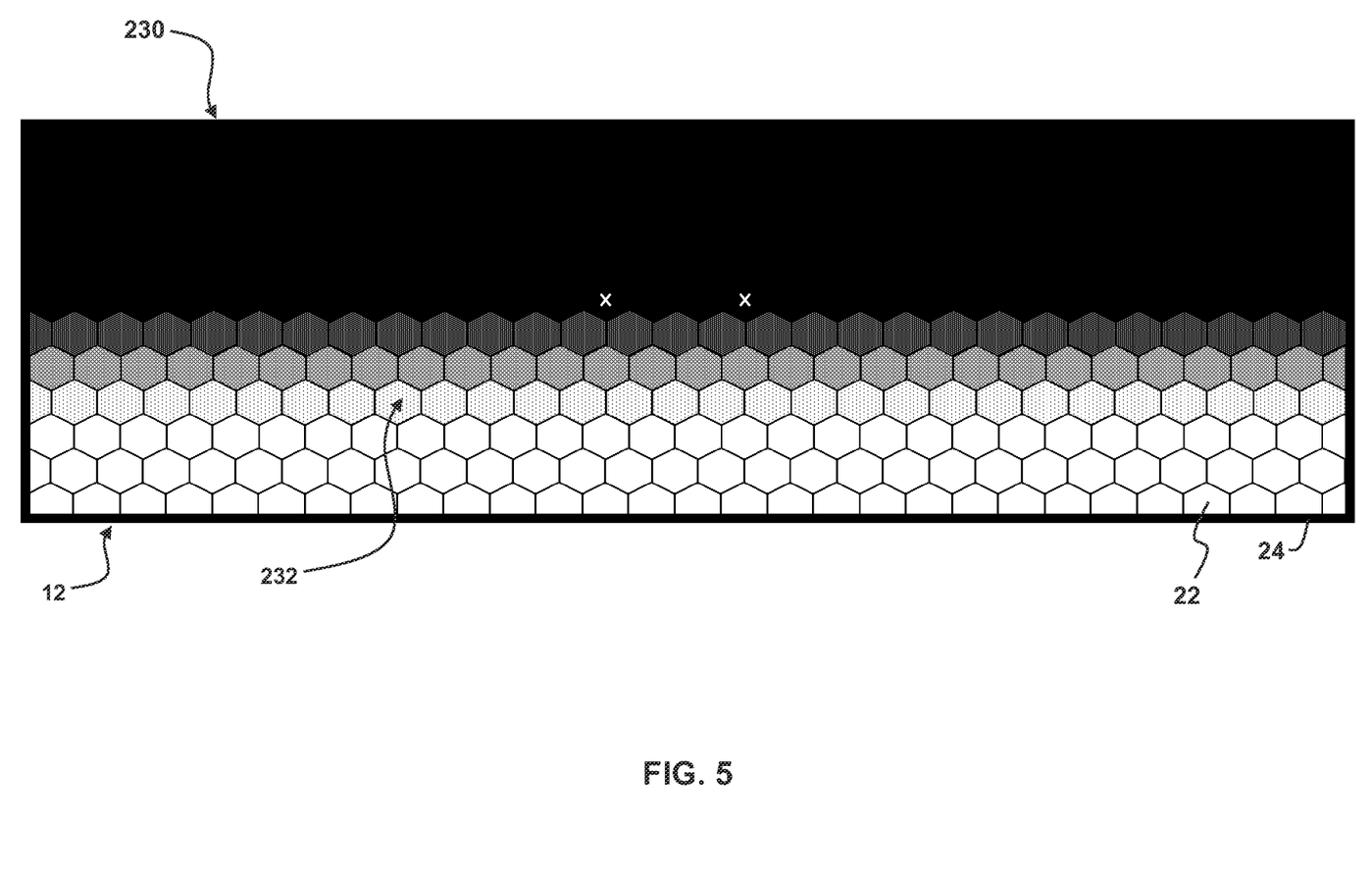
FIG. 5 shows an exemplary embodiment of the visor of FIG. 1 operated in a second exemplary gradient blocking mode.

With reference to FIG. 5, a second exemplary gradient blocking mode is described. Particularly, in the example of FIG. 5, a first subset of pixels forms a blocker 230 and a second subset of pixels forms a transition gradient 232. As with the blocker 30 in the example of FIG. 2, the blocker 230 is positioned such that it encompasses the projected eye positions (shown as 'x' markings within the blocker 230) on the visor 12 and the pixels thereof are operated in a most opaque pixel optical state. However, in contrast with the blocker 30, the blocker 230 includes all pixels of the visor 12 that are arranged in a first direction with respect to the projected eye positions (i.e., in the upward direction, above the projected eye positions along the vertical axis, in the illustrated example). In the illustrated embodiment, the blocker 230 extends from edge to edge across the width of the visor 12 in a direction that is orthogonal to the first direction (i.e., left and right along the horizontal axis, in the illustrated example).

The transition gradient 232 is arranged in a second direction, that is opposite the first direction, with respect to projected eye positions (i.e., in the downward direction, below the projected eye positions along the vertical axis, in the illustrated example). Particularly, the transition gradient 232 is arranged along a bottom perimeter of the blocker 230 and the pixels of the transition gradient 232 have progressively decreasing opacities with increased distance in the second direction from the bottom perimeter of the blocker 230 and/or the projected eye positions, such that the pixels of the transition gradient 232 that are relatively closer to the bottom perimeter of the blocker 230 and/or the projected eye positions are more opaque than the pixels of the transition gradient 232 that are relatively further from the bottom perimeter of the blocker 230 and/or the projected eye positions. In the illustrated embodiment, the transition gradient 232 also extends from edge to edge across the width of the visor 12 in a direction that is orthogonal to the first and second directions (i.e., left and right along the horizontal axis, in the illustrated example).

Figure 6:
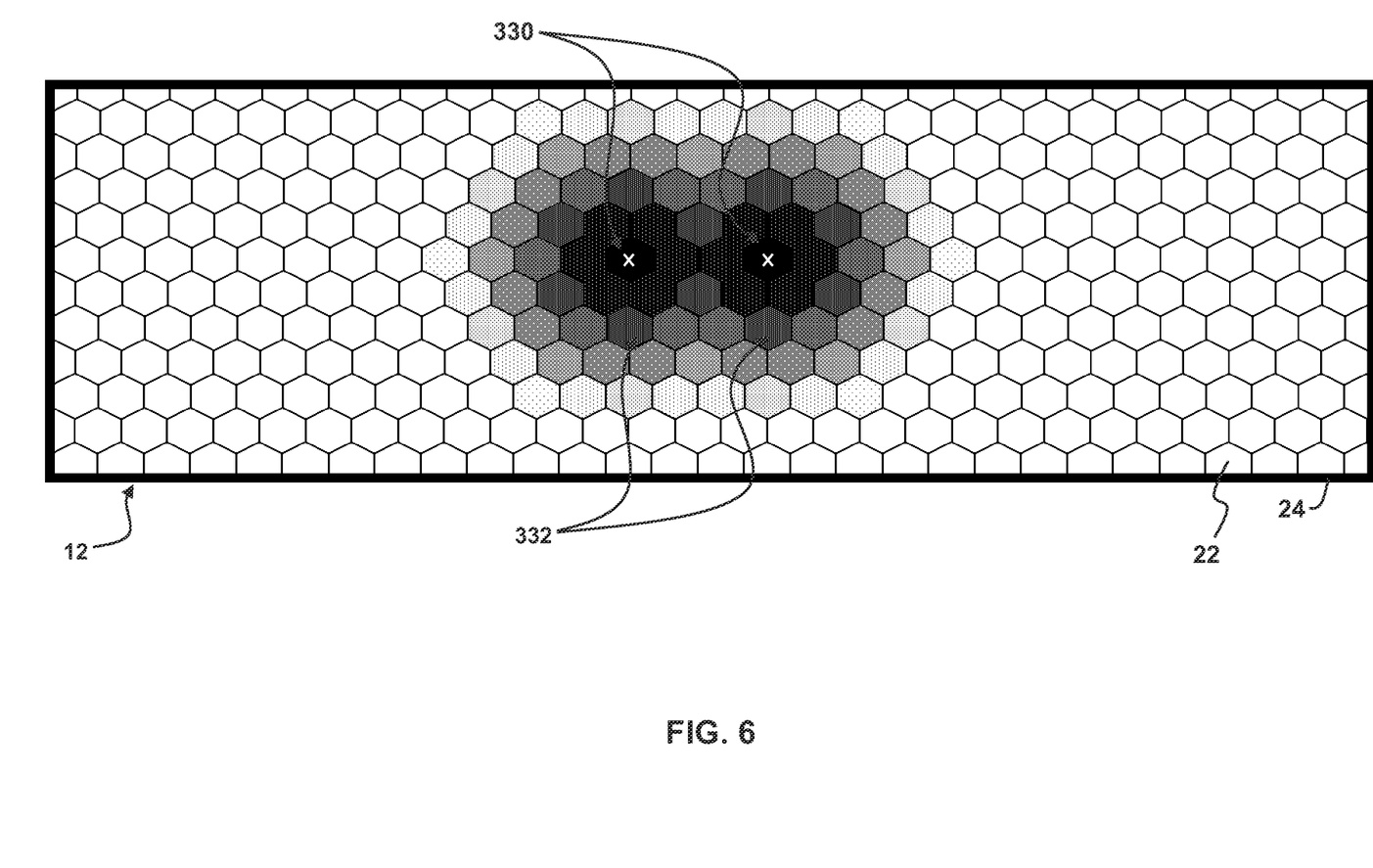
FIG. 6 shows an exemplary embodiment of the visor of FIG. 1 operated in a third exemplary gradient blocking mode.

With reference to FIG. 6, a third exemplary gradient blocking mode is described. Particularly, in the example of FIG. 6, a first subset of pixels forms a blocker 330 and a second subset of pixels forms a transition gradient 332. As with the blocker 30 in the example of FIG. 2, the blocker 330 is positioned such that it encompasses the projected eye positions (shown as 'x' markings within the blocker 230) on the visor 12 and the pixels thereof are operated in a most opaque pixel optical state. However, in contrast with the blocker 30, the blocker 330 consists of a first group of pixels positioned to encompass a first projected eye position and a second group of pixels positioned to encompass a second projected eye position. As used herein, a "group" of pixels should be understood to include any number of pixels, including just one pixel. Particularly, in the illustrated embodiment, the blocker 330 consists of a single pixel that encompasses a projected left eye position and single pixel that encompasses a projected right eye position. However, the blocker 330 can alternatively include larger groups of pixels that encompass each of the projected eye positions.

The transition gradient 332 consists of a first group of pixels arranged along at least a portion of a perimeter of the first group of pixels of the blocker 330 and a second group of pixels arranged along at least a portion of a perimeter of the second group of pixels of the blocker 330. In some embodiments, the first group of pixels of the transition gradient 332 encompasses the first group of pixels of the blocker 330 and the second group of pixels of the transition gradient 332 the second group of pixels of the blocker 330. In the illustrated embodiment, it should be noted, the first and second groups of pixels of the transition gradient 332 overlap with one another. The pixels of each group in the transition gradient 332 have progressively decreasing opacities with increased distance from the blocker 330 and/or the projected eye positions, such that the pixels of the transition gradient 332 that are relatively closer to the blocker 330 and/or the projected eye positions are more opaque than the pixels of the transition gradient 332 that are relatively further from the blocker 330 and/or the projected eye positions.

Returning to FIG. 4, the method 100 continues with initializing an optical state of the visor (block 120). Particularly, the controller 10 initializes the visor 12 by operating the visor 12 to have a predetermined initial optical state. In at least some embodiments, the predetermined initial optical state has a pattern corresponding to the blocking mode that was set for the virtual visor system 20, using initialized projected eye positions (e.g., in the center of the visor). In alternative embodiments, the predetermined initial optical state may include a subset of pixels operated in the most opaque optical state that form a cross, a grid, or some other pattern that is optimal for an initial shadow detection on the face of the driver 16, prior to switching to operation according to the set blocking mode. In some embodiments, the controller 10 initializes the visor 12 in response to receiving a control signal from a vehicle computer (not shown) or a driver-operated switch/button indicating that the virtual visor system 20 is to begin operation.

The controller 10 stores the initial optical state in a memory of the controller 10 as the current optical state of the visor 12. For clarity, it is noted that the current optical state of the visor 12 refers to the optical state that is currently displayed by the visor 12 and, likewise, the current pixel optical state $O_{i,j}^{Current}$ for each respective pixel 22 refers to the pixel optical state that is currently displayed by the respective pixel at the location (i, j) on the visor 12. Thus, the current optical state for the visor 12 is a collection of current pixel optical states $O_{i,j}^{Current}$ for each pixel 22 of the visor 12. In a first update cycle of the method 100, the current optical state of the visor 12 is the predetermined initial optical state discussed above. In each subsequent update cycle of the method 100, the current optical state of the visor 12 is the most recent updated optical state, discussed below with respect to blocks 170 and 180. As used herein, the phrase "update cycle" refers to a respective iteration of the loop illustrated in FIG. 4, consisting generally of the blocks 130, 140, 150, 160, 170, and 180, described in detail below.

The method 100 continues with capturing an image of the face of the driver (block 130). Particularly, the camera 14, which is oriented toward the face of the driver 16, captures an image of the face of the driver 16. The controller 10 receives the captured image(s) from the camera 14. In one embodiment, the controller 10 stores the captured image(s) from the camera 14 in the memory of the controller 10. In at least some embodiments, the camera 14 is configured to continuously or periodically capture images of the face of the driver 16 in the form of video and, except for setting of the blocking mode in block 110 and initializing the visor 12 in block 120, the processes of the method 100 can be repeated for each image frame captured by the camera 14.

The method 100 continues with determining the current pose of the head of the driver and the current eye positions of the driver (block 140). Particularly, based on the image(s) captured by the camera 14, the controller 10 determines a current pose of the head of the driver 16 (i.e., the position and orientation of the head within the cabin 17). The controller 10 stores the current pose of the head of the driver 16 in the memory of the controller 10. The pose of the head of the driver 16 can, for example, be characterized and/or represented by a set of coordinates $[X^{head}, Y^{head}, Z^{head}]$ defining the position of the head of the driver 16 and a set of angles $[\theta_X^{head}, \theta_Y^{head}, \tau_Z^{head}]$ defining the orientation of the head of the driver 16.

In at least one embodiment, the controller 10 detects the pose of the head of the driver 16 $[X^{head}, Y^{head}, Z^{head}]$ and $[\theta_X^{head}, \theta_Y^{head}, \tau_Z^{head}]$ in the frame using a human pose estimation algorithm. It will be appreciated by those of ordinary skill in the art that a human pose estimation algorithm is generally an algorithm that determines a set of key points or coordinates within the image frame that correspond to key features of a person. As applied to images of a human face and pose detection thereof, these key points will generally include facial landmarks including, for example, eyes, ears, nose, mouth, forehead, chin, and the like. It will be appreciated by those of ordinary skill in the art that wide variety of human pose estimation algorithms exist and that many different human pose estimation algorithms can be suitable adapted to determining the current pose of the head of the driver 16 $[X^{head}, Y^{head}, Z^{head}]$ and $[\theta_X^{head}, \theta_Y^{head}, \tau_Z^{head}]$.

Based on the current pose of the head of the driver 16 $[X^{head}, Y^{head}, Z^{head}]$ and $[\theta_X^{head}, \theta_Y^{head}, \tau_Z^{head}]$ and/or simply based on the key point detection of the human pose estimation algorithm, the controller 10 determines the current positions of the eyes of the driver 16 within the cabin 17. The controller 10 stores the current positions of the eyes of the driver 16 in the memory of the controller 10. The current positions of the eyes of the driver 16 can, for example, be characterized and/or represented by a set of coordinates $[X^{left}, Y^{left}, Z^{left}]$ defining the position of the left eye of the driver 16 and a set of coordinates $[X^{right}, Y^{right}, Z^{right}]$ defining the position of the left eye of the driver 16. As mentioned above, the position of the eyes of the driver 16 $[X^{left}, Y^{left}, Z^{left}]$ and $[X^{right}, Y^{right}, Z^{right}]$ within the cabin 17 are one of the two parameters required to determine the necessary optical state of the visor 12 to block sunlight from striking the eyes of the driver 16.

The method 100 continues with determining a current sunlight direction (block 150). Particularly, based on the image(s) captured by the camera 14, the controller 10 determines the current sunlight direction. The controller 10 stores the current sunlight direction in the memory of the controller 10. Due to its large size and distance from the earth, the sun essentially acts as a directional light source. Thus, the sunlight direction can be represented by vector that passes through the visor 12 and toward the driver 16. Though, it should be appreciated that some non-parallel sunrays may pass through the visor 12 and, as such, this vector is merely an approximation. This vector can be represented by a pair of angles including the angle at which the sunlight passes through the visor 12 along a first axis (e.g. a horizontal axis) and the angle at which the sunlight passes through the visor 12 along a second axis (e.g., a vertical axis). The current sunlight direction can, for example, be characterized and/or represented by an angle pair $[\theta_X^{sun}, \theta_Y^{sun}]$, where $-90°<\theta_X<90°$ is a horizontal angle at which the sunlight passes through the visor 12 and $-90°<\theta_Y<90°$ is a vertical angle at which the sunlight passes through the visor 12. It should be appreciated that these angles can be defined with respect to a variety of different frames of reference and a sunlight direction [0°, 0°] may, for example, be normal to the plane/surface of the visor 12, normal to the viewing direction of the camera 14, or normal to the viewing directly of the driver 16. Likewise, the possible ranges for the angle pair $[\theta_X^{sun}, \theta_Y^{sun}]$ can be defined differently depending on the frame of reference.

It should be appreciated that the two-dimensional angle pair $[\theta_X^{sun}, \theta_Y^{sun}]$ is sufficient to characterize and/or represent the current sunlight direction, but that this angle pair is relative to a known normal vector. The current sunlight direction can, of course, be characterized and/or represented in three-dimensional terms by three angles $[\theta_X^{sun}, \theta_Y^{sun}, \theta_Z^{sun}]$, which may, for example, be in the same reference frame as the previously determined positions of the eyes and/or head of the driver 16. This may be the preferred characterization of the sunlight direction in embodiments in which the physical positioning of visor 12 and/or the camera 14 are adjustable.

The controller 10 can be configured to determine the current sunlight direction $[\theta_X^{sun}, \theta_Y^{sun}]$ using a wide variety of methods, in general by detecting the shadow 52 that is projected onto the face of the driver 16 by the optical state of the visor 12. Particularly, the controller 10 determines the current sunlight direction $[\theta_X^{sun}, \theta_Y^{sun}]$ based on (i) the position of the shadow 52 on the face of the driver 16 in the image(s) captured by the camera 14, (ii) the previously determined current pose of the head of the driver 16 $[X^{head}, Y^{head}, Z^{head}]$ and $[\theta_X^{head}, \theta_Y^{head}, \tau_Z^{head}]$ and (iii) a known current pose of the visor 12 (i.e., the position and orientation of the visor 12 within the cabin 17). More particularly, given the current pose of the visor 12 and the current pose of the head of the driver 16 $[X^{head}, Y^{head}, Z^{head}]$ and $[\theta_X^{head}, \theta_Y^{head}, \tau_Z^{head}]$ the controller 10 determines the current sunlight direction $[\theta_X^{sun}, \theta_Y^{sun}]$ as that which would project a shadow onto the face of the driver 16 at the position and/or orientation of the detected shadow 52 in the image(s) from the camera 14.

In at least one embodiment, the controller 10 is configured to determine the current sunlight direction $[\theta_X^{sun}, \theta_Y^{sun}]$ in a probabilistic manner by determining a set (e.g., an array) of probabilities corresponding to each of a predefined plurality of possible sunlight directions. In one embodiment, the set of probabilities are continuously updated and refined based on new information, for example using Bayes' Theorem, to arrive at an accurate prediction of the current sunlight direction $[\theta_X^{sun}, \theta_Y^{sun}]$. One exemplary probabilistic method for determining the most likely current sunlight direction $[\theta_X^{sun}, \theta_Y^{sun}]$ is described in greater detail below with respect to FIG. 7.

The method 100 continues with determining projected eye positions by projecting the current eye positions onto the visor using the current light direction (block 160). Particularly, the controller 10 determines at least one position on the visor 12 at which the sun (or other light source) shines through the visor 12 into eyes of the driver 16 or other passenger. More particularly, in at least one embodiment, these positions on the visor 12 are projected eye positions. In at least one embodiment, the controller 10 determines the projected eye positions by projecting the current positions of the eyes $[X^{left}, Y^{left}, Z^{left}]$ and $[X^{right}, Y^{right}, Z^{right}]$ of the driver 16 onto the plane/surface of the visor 12 using the current sunlight direction [$\theta_X^{sun}$, $\theta_Y^{sun}$]. In the case that the current sunlight direction [$\theta_X^{sun}$, $\theta_Y^{sun}$] was determined in a probabilistic manner characterized by a set of probabilities, the controller 10 performs this projection using the sunlight direction having the highest probability value according to the most recently updated set of probabilities.

A two-dimensional coordinate space of the plane/surface of the visor 12 has maximum dimensions equal to the physical dimensions A×B (e.g., 24×8 inches) of the visor 12, where A denotes the horizontal width of the visor 12 and B denotes the vertical height of the visor 12. The projected positions of the eyes of the driver 16 onto the visor 12 can, for example, be characterized and/or represented by a set of coordinates [$X_{visor}^{left}$, $Y_{visor}^{left}$] defining the projected position of the left eye of the driver 16 in the coordinate space of the plane/surface of the visor 12 and a set of coordinates [$X_{visor}^{right}$, $Y_{visor}^{right}$] defining the projected position of the right eye of the driver 16 in the coordinate space of the plane/surface of the visor 12.

The method 100 continues with determining an updated optical state for the visor according to the set blocking mode and based on the projected eye positions (block 170). Particularly, the controller 10 determines the updated optical state for the visor 12 based on the at least one position on the visor 12 at which the sun (or other light source) shines through the visor 12 into eyes of the driver 16 or other passenger. More particularly, the controller 10 determines the updated optical state for the visor 12 based on the projected eye positions [$X_{visor}^{left}$, $Y_{visor}^{left}$] and [$X_{visor}^{right}$, $Y_{visor}^{right}$] of the driver 16 and in accordance with the blocking mode that was set previously.

Much like the initialized optical state of the visor 12, the updated optical state for the visor 12 is characterized by an array of updated pixel optical states $O_{i,j}^{Updated}$ for the pixels 22 of the visor 12, each characterized by an integer value indicating a respective updated pixel optical state $O_{i,j}^{Updated}$ of a respective pixel at a location (i, j). In embodiments in which the pixels 22 of the visor 12 are arranged in a uniform grid formation having a plurality of m columns and a plurality of n rows, the updated optical state for the visor 12 is characterized in particular by an [m×n] array of integer values. In at least one embodiment, the integer values have a value selected from a predetermined range of values (e.g., 0-255) corresponding to a plurality of possible pixel optical states (e.g., where 0 indicates a most transparent pixel optical state, the intermediate values indicate progressively more opaque opacities pixel optical state, and 255 indicates a most opaque pixel optical state).

As described above, the blocking modes described herein are, in particular, gradient blocking modes that include a gradient of opacities. The controller 10 determines, for each respective pixel 22 of the visor 12, an updated pixel optical state $O_{i,j}^{Updated}$ based on the (i) the previously set gradient blocking mode and (ii) a relationship between the position of the respective pixel 22 and the projected eye positions [$X_{visor}^{left}$, $Y_{visor}^{left}$] and [$X_{visor}^{right}$, $Y_{visor}^{right}$] on the visor 12. Particularly, if a respective pixel 22 is positioned relative to the projected eye positions [$X_{visor}^{left}$, $Y_{visor}^{left}$] and [$X_{visor}^{right}$, $Y_{visor}^{right}$] on the visor 12 such that it is located within the blocker (e.g., the blockers 30, 230, 330 described above) defined by the gradient blocking mode, the controller 10 determines the updated pixel optical state $O_{i,j}^{Updated}$ for the respective pixel 22 as being a predetermined pixel optical state of the blocker (e.g., a most opaque pixel optical state).

Likewise, if the respective pixel 22 is positioned relative to the projected eye positions [$X_{visor}^{left}$, $Y_{visor}^{left}$] and [$X_{visor}^{right}$, $Y_{visor}^{right}$] on the visor 12 such that it is located within the transition gradient (e.g., the transition gradients 32, 232, 332 described above) defined by the gradient blocking mode, the controller 10 determines the updated pixel optical state $O_{i,j}^{Updated}$ for the respective pixel 22 as being a pixel optical state from a set of pixel optical states of the transition gradient, which depends on a distance between the position of the respective pixel and the projected eye positions [$X_{visor}^{left}$, $Y_{visor}^{left}$] and [$X_{visor}^{right}$, $Y_{visor}^{right}$] or, equivalently, on a distance between the position of the respective pixel and the blocker.

Finally, if the respective pixel 22 is positioned relative to the projected eye positions [$X_{visor}^{left}$, $Y_{visor}^{left}$] and [$X_{visor}^{right}$, $Y_{visor}^{right}$] on the visor 12 such that it is not located within the blocker or the transition gradient defined by the gradient blocking mode, then the controller 10 determines the updated pixel optical state $O_{i,j}^{Updated}$ for the respective pixel 22 as a predetermined 'transparent' pixel optical state (e.g., the least opaque pixel optical state).

Finally, the method 100 continues with operating the visor with the updated optical state (block 180). Particularly, the controller 10 operates the visor 12 to display the updated optical state. In this way, the optical state of the visor 12 reflects the most recently determined sunlight direction [$\theta_X^{sun}$, $\theta_Y^{sun}$] and the most recently determined position of the eyes of the driver 16 [$X^{left}$, $Y^{left}$, $Z^{left}$] and [$X^{right}$, $Y^{right}$, $Z^{right}$], thereby providing continuous blocking of sunlight from striking the eyes of the driver. After updating the optical state of the visor 12, the method 100 returns to block 130 and begins processing the next image received from the camera 14 in the next update cycle.

Probabilistic Determination of Sunlight Direction

Figure 7:
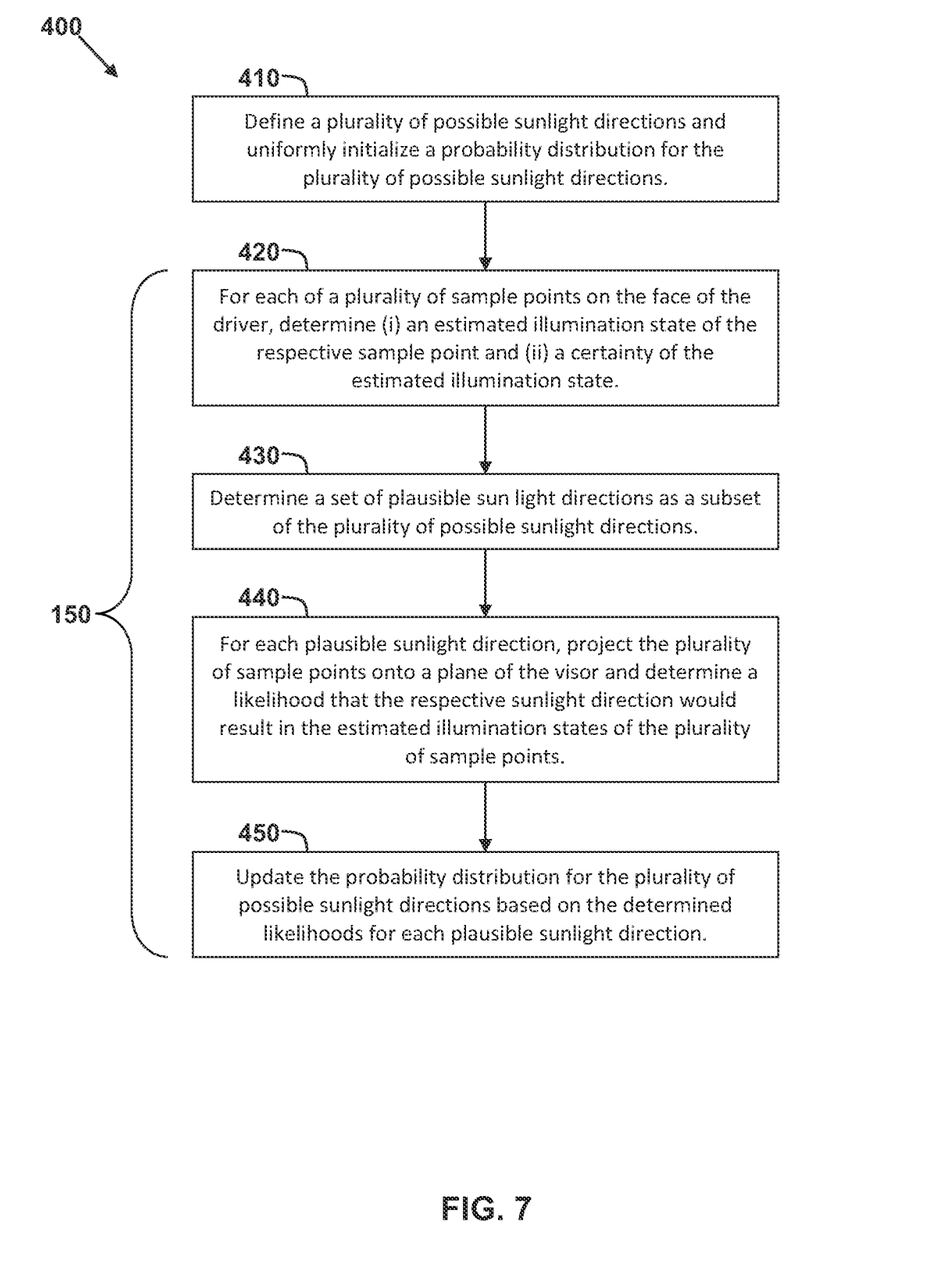
FIG. 7 shows an exemplary method for determining the most likely current sunlight direction in a probabilistic manner using Bayesian Inference.

FIG. 7 shows an exemplary method 400 for determining the most likely current sunlight direction [$\theta_X^{sun}$, $\theta_Y^{sun}$] in a probabilistic manner using Bayesian Inference. The method 400 begins with defining a plurality of possible sunlight directions and uniformly initializing a probability distribution for the plurality of possible sunlight directions (block 410). Particularly, prior to operation (i.e., prior to initializing the optical state of the visor 12 in block 120 of the method 100), the controller 10 defines a plurality of p possible sunlight directions. As described above, the sunlight direction can be represented by vector that passes through the visor 12 and toward the driver 16 or, more particularly, as pair of angles including the angle at which the sunlight passes through along a first axis (e.g. a horizontal axis) and the angle at which the sunlight passes through along a second axis (e.g., a vertical axis). Moreover, it can be assumed that the eyes of the driver 16 will generally be located within a predetermined region of the cabin 17. Thus, only sunlight directions that also pass through this predetermined region within the cabin 17 need to be considered for operating the visor 12 because only this limited subset of sunlight directions will typically result in sunlight striking the eyes of the driver 16. For example, the predetermined region within the cabin 17 might be defined such that only sunlight angles [$\theta_X$, $\theta_Y$] where $-20° < \theta_X < 20°$ and $-10° < \theta_Y < 10°$ can reasonably be expected to strike the eyes of the driver 16.

The controller 10 predefines the plurality of p possible sunlight directions, which can be thought of as a two-dimensional grid of possible sunlight directions. In one example, the controller 10 defines the p possible sunlight directions in 2° increments across the both the horizontal X-direction and the vertical Y-direction and bounded by predetermined region within the cabin 17 within which the eyes of the driver 16 are expected to be located, resulting in, for example, a 20×10 grid of possible sunlight directions or p=200 possible sunlight directions. Each of the p possible sunlight directions is initialized with a uniform probability lip, such that each of the p possible sunlight directions is assumed to be equally likely at the start of the method 100. The resulting probability distribution can be considered to take the same form as the grid of possible sunlight directions (e.g., a 20×10 grid of probabilities) and collectively add up to 1.0 or 100%. The controller 10 stores the p possible sunlight directions and the associated probabilities in the memory of the controller 10. As will be described in further detail, these probabilities will be continuously updated and refined based on new information, for example using Bayes' Theorem, to arrive at an accurate prediction of the current sunlight direction $[\theta_X^{sun}, \theta_Y^{sun}]$.

Figure 8:
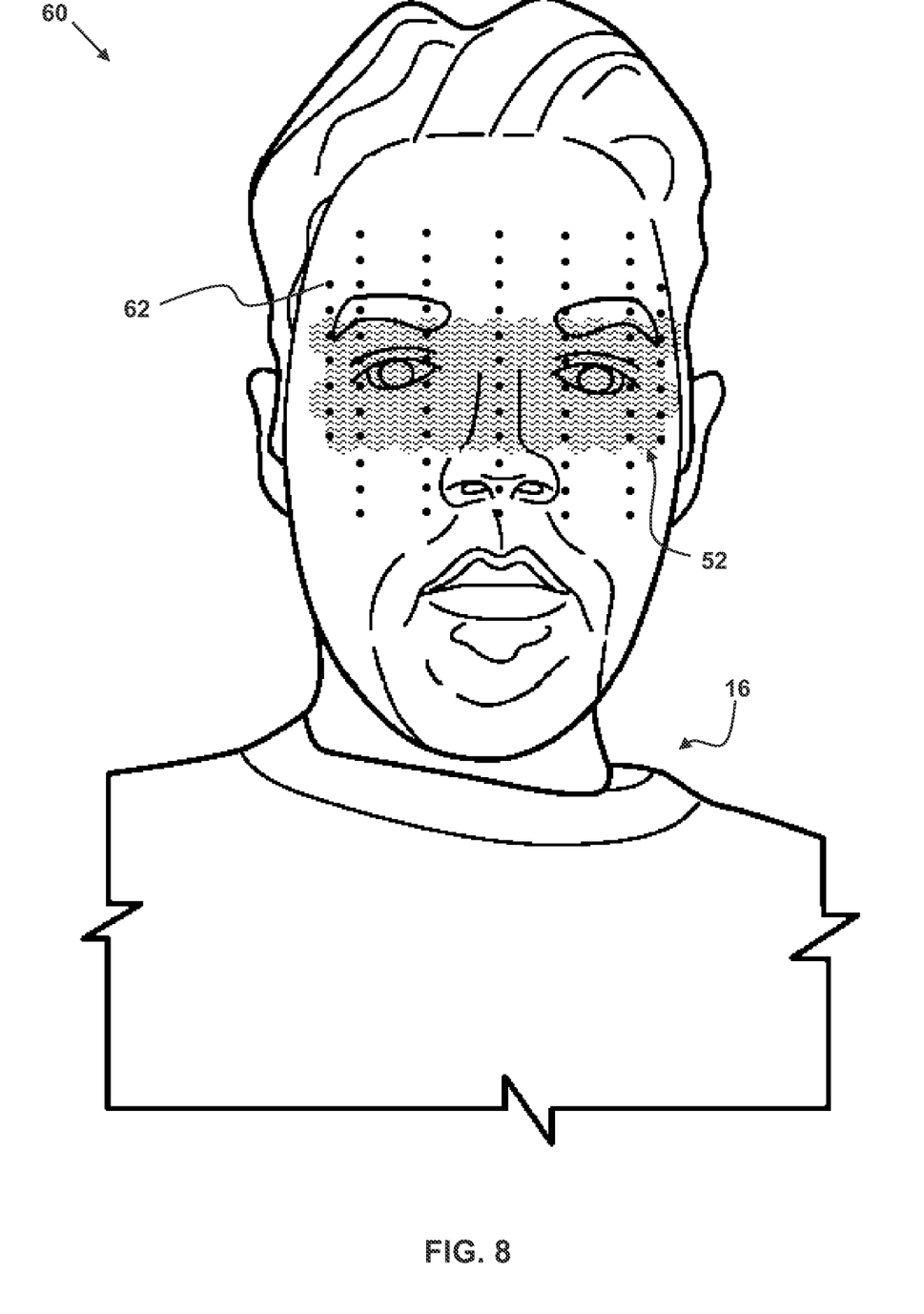
FIG. 8 shows a portion of an exemplary image of the face of the driver captured by the camera of FIG. 1, in which sample points are illustrated.

The method 400 continues with, for each of a plurality of sample points on the face of the driver, determining (i) an estimated illumination state of the respective sample point and (ii) a certainty of the estimated illumination state (block 420). Particularly, once the current pose of the head of the driver 16 $[X^{head}, Y^{head}, Z^{head}]$ and $[\theta_X^{head}, \theta_Y^{head}, \tau_Z^{head}]$ is determined, a defined set of sample points on the face of the driver 16 is continuously tracked in the image(s) of the face of the driver 16. FIG. 8 shows a portion of an exemplary image 60 of the face of the driver 16. A plurality of sample points 62 are defined on the face of the driver 16 according to a predetermined pattern and distribution and at least include sample points in regions of the face around the eyes of the driver 16. In the illustrated embodiment, the sample points 62 are arranged in seven columns in which the five central columns include an equal number of uniformly spaced sample points 62, and in which the left and right most columns include a smaller number of sample points 62. However, it should be appreciated that a wide variety of patterns can be equivalently utilized. As each image is captured, the controller 10 determines the 2D location in the image of each of the sample points based on the current pose of the head of the driver 16 $[X^{head}, Y^{head}, Z^{head}]$ and $[\theta_X^{head}, \theta_Y^{head}, \tau_Z^{head}]$. Particularly, it should be appreciated that the sample points have a defined location on the face of the driver 16 and, thus, when the pose of the head of the driver 16 $[X^{head}, Y^{head}, Z^{head}]$ and $[\theta_X^{head}, \theta_Y^{head}, \tau_Z^{head}]$ changes, both the 3D locations of the sample points within the cabin 17 and the 2D locations of the sample points in the images change.

Once the sample points are located in the image, the controller 10 determines an estimated illumination state of each sample point based on the image and based on a previously estimated illumination state for each respective sample point. With reference again to FIG. 8, as can be seen, a first subset of the sample points 62 are located within in a shadow 52 that has been projected onto the face of the driver 16 by the optical state of the visor 12 and a second subset of the sample points 62 are located within an illuminated region of the face of the driver 16. In the simplest embodiment, the estimated illumination state of each sample point is a binary classification of whether the respective sample point is in a shadow or not in a shadow. However, in further embodiments, the estimated illumination state of each sample point may have more than two possible classifications (e.g., including classifications for intermediate illumination levels). Additionally, in some embodiments, the estimated illumination state of each sample point may be numerical value indicating, in absolute or relative terms, an amount of illumination at the respective sample point in the image.

In at least some embodiments, the controller 10 also determines a certainty of the estimated illumination state of each sample point. Particularly, the shadow detection problem is challenging due to the many variables involved. The face of each driver 16 has a unique skin tone, shape, and size, the shape also varying over time due to different facial expressions of the driver 16. Additionally, the lighting environment that the driver 16 is in is continually changing, with both direct sunlight as well as indirect light bouncing off the objects and environment around the driver 16. As a result, there is a varying degree of uncertainty in determining whether each sample point on the face is in shadow or not. This uncertainty can lead to a noisy estimation of the illumination states, which can result in unnecessary and distracting changes to the optical state of the visor 12. Therefore, it is advantageous to incorporate the uncertainty into a coherent estimation of the illumination state of each sample point.

Returning to FIG. 7, the method 400 continues with determining a set of plausible sunlight directions as a subset of the plurality of possible sunlight directions (block 430). Particularly, in at least some embodiments, the controller 10 determines a limited set of plausible sunlight directions as a subset of the plurality of p possible sunlight directions using one or more heuristics designed to eliminate possible sunlight directions that are in fact implausible or impossible. In this way, the method 400 advantageously limits the number of possible sunlight directions that must be tested. However, in at least some cases, the controller 10 does not eliminate any of the p possible sunlight directions and the set of plausible sunlight directions simply includes all of the plurality of p possible sunlight directions.

In some embodiments, the controller 10 determines a first bounding box around all of the pixels on the visor 12 that are operated in the opaque optical state and a second bounding box around all of the sample points on the face of the driver 16 that which are classified to be in a shadow. The controller 10 determines which possible sunlight directions would result in an overlap between the first bounding box around the opaque pixels and the second bounding box around the shaded sample points, after projection of the second bounding box onto the visor. If a possible sunlight direction projects the second bounding box around the shaded sample points onto a region of the visor 12 that does not overlap with the first bounding box around the opaque pixels, then that possible sunlight direction is implausible and does not need to be considered. In addition, all possible sunlight directions that project further the second bounding box from the first bounding box can also be excluded. In other words, a particular sunlight direction does not create an overlap between the bounding boxes, it is easily determined that which possible sunlight directions would result in the bounding boxes being even further from one another.

In some embodiments, the controller 10 determines the limited set of plausible sunlight directions as a subset of the plurality of p possible sunlight directions that are within a predetermined range/difference from the estimated sunlight direction of the previous image frame (e.g., only the possible sunlight directions that are within ±5° in the X or Y directions). The predetermined range/difference will generally be a function of the frame rate at which images are captured by the camera 14 and/or processed by the controller 10. Additionally, the predetermined range/difference may further be a function of a rate of rotation of the vehicle 18 during a turning maneuver.

In some embodiments, the controller 10 determines an expected change in the sunlight direction based on previous changes in the estimated sunlight directions over two or more previous image frames. The controller 10 determines the limited set of plausible sunlight directions based on the sunlight direction of the previous image frame and the expected change in the sunlight direction. As an illustrative example, during a turning maneuver of the vehicle 18, the sunlight directions will generally change one way or the other in the horizontal X direction over a sequence of consecutive image frames. Accordingly, if over the course of the previous few frames, the sunlight direction has shifted positively in the horizontal X direction by a threshold amount, it can be assumed that the sunlight direction in the current frame will continue to shift positively in the horizontal X direction or stay the same. Thus, possible sunlight directions representing negative shifts in the horizontal X direction (i.e., the opposite direction of change compared to the previous frames) can be considered implausible.

In some embodiments, the controller 10 is connected to a vehicle computer (not shown) or vehicle sensor (not shown) configured to provide additional contextual information from which changes in the sunlight direction can be inferred, such as a direction of travel, a time of day, acceleration data, steering information, global positioning data, etc. Based on the additional contextual information, the controller 10 eliminates some of the plurality of p possible sunlight directions as being implausible or impossible. In some embodiments, the controller 10 determines an expected change in the sunlight direction based on the additional contextual information and determines the limited set of plausible sunlight directions based on the sunlight direction of the previous image frame and the expected change in the sunlight direction.

The method 400 continues with, for each plausible sunlight direction, projecting the plurality of sample points onto a plane of the visor and determine a likelihood that the respective sunlight direction would result in the estimated illumination states of the plurality of sample points (block 440). Particularly, for each plausible sunlight direction in the limited set of plausible sunlight directions (or, in some cases, each possible sunlight direction in the plurality of p possible sunlight directions), controller 10 projects the sample points on the face of the driver onto a plane/surface of the visor 12 using the respective sunlight direction. As noted above, an estimated illumination state and certainty was determined for each sample point. Thus, the projection of these points onto the plane/surface of the visor 12 results in a set of points in the plane/surface of the visor 12, each point having an estimated illumination state and certainty.

The controller 10 compares the estimated illumination state and certainty of each projected sample point with the optical state of the visor 12 at the time the image was captured. Based on this comparison, the controller 10 determines a likelihood/probability that the current optical state of the visor 12 would have resulted in the estimated illumination states of the sample points. For example, if the sunlight direction used in the projection results in a high correspondence between sample points estimated to be in a shadow and pixels of the visor 12 that are operated in the opaque optical state, then the sunlight direction has a higher likelihood/probability of being correct. Conversely, if the sunlight direction used in the projection results in a low correspondence between sample points estimated to be in a shadow and pixels of the visor 12 that are operated in the opaque optical state, then the sunlight direction has a lower likelihood/probability of being correct.

Once repeated for all of the plausible sunlight directions (or, in some case, all of the p possible sunlight directions), this provides a 2D grid of likelihood/probability estimates in the same form as the grid of possible sunlight directions discussed above (e.g., a 20×10 grid of probabilities). If not done so in their original determination, the controller 10 normalizes the likelihood/probability estimates such that they add up to 1.0 or 100%. Additionally, the controller 10 assigns a very small likelihood/probability estimate to each of the possible sunlight directions that were not tested as a result of being eliminated as being implausible or impossible.

The method 400 continues with updating the probability distribution for the plurality of possible sunlight directions based on the determined likelihoods for each plausible sunlight direction (block 450). Particularly, the controller 10 updates the probability distribution associated with the plurality of p possible sunlight directions, stored in the memory of the controller 10, based on the determined likelihood/probability estimates for the current image. In one embodiment, the controller 10 updates the probability distribution for the plurality of p possible sunlight directions using Bayesian Inference and/or Bayes' Theorem or any other suitable mathematical operation from incorporating new information into a probability estimate. The resulting updated probability distribution takes the same form as the grid of possible sunlight directions discussed above (e.g., a 20×10 grid of probabilities) and adds up to 1.0 or 100%. The controller 10 stores updated probability distribution in the memory of the controller 10. It will be appreciated that the process of estimating the sunlight direction in this manner effectively reduces the effect of the noisy estimation of the illumination states and enables a more stable prediction.

It should be appreciated that the processes of blocks 420, 430, 440, and 450 of the method 400 comprise one exemplary implementation of the process of block 150 in the method 100, in which the current sunlight direction $[\theta_X^{sun}, \theta_Y^{sun}]$ is determined. Thus, once the probability distribution for the current sunlight direction $[\theta_X^{sun}, \theta_Y^{sun}]$ has been determined, the controller 10 proceeds to the process of block 160 in the method 100, as described above.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A visor system comprising:
   a camera mounted within an environment and configured to capture a plurality of images of a face of a person in the environment;
   a visor mounted within the environment and having a plurality of pixels arranged contiguously, an optical state of the visor being adjustable by selectively operating each respective pixel of the plurality of pixels with a respective pixel optical state selected from a plurality of pixel optical states, each pixel optical state in the plurality of pixel optical states having a different opacity such that the respective pixel blocks a different amount of light from passing through a corresponding area of the visor; and
   a controller operably connected to the camera and to the visor, the controller being configured to receive the plurality of images from the camera and, for each respective image in the plurality of images:
      determine, based on the respective image, at least one position on the visor at which a light source shines through the visor into an eye of the person;
      select an operating mode for the visor from a plurality of operating modes, each respective operating mode in the plurality of operating modes defining a pattern including (i) a first subset of pixels operated in a first pixel optical state from the plurality of pixel optical states having a first opacity, the first subset of pixels including at least two contiguous pixels and (ii) a second subset of pixels operated in a set of second pixel optical states from the plurality of pixel optical states having opacities that are less opaque than the first opacity, the second subset of pixels including at least two contiguous pixels, the opacities of the second subset of pixels defining the gradient of opacities;
      determine, based on the at least one position on the visor and in accordance with the pattern defined by the selected operating mode for the visor, an updated optical state for the visor to block the light source from shining through the visor into the eye of the person, the updated optical state including the first subset of pixels arranged so as to encompass the at least one position on the visor, the second subset of pixels being arranged along at least a portion of a perimeter of the first subset of pixels; and
      operate the visor to display the updated optical state, wherein, when a first operating mode of the plurality of operating modes is selected, (i) the first subset of pixels includes all pixels of the plurality of pixels that are arranged in a first direction with respect to the at least one position on the visor, the first subset of pixels spanning from edge to edge across a width of the visor in a direction that is orthogonal to the first direction and (ii) the second subset of pixels is arranged along a portion of the perimeter of the first subset of pixels that is in a second direction with respect to the at least one position on the visor, the second direction being opposite the first direction, the second subset of pixels spanning from edge to edge across a width of the visor in the direction that is orthogonal to the first direction, and
      wherein, when a second operating mode of the plurality of operating modes is selected, (i) the first subset of pixels includes a first group of pixels that encompasses a first position on the visor at which the light source shines through the visor into a left eye of the person and a second group of pixels that encompasses a second position on the visor at which the light source shines through the visor into a right eye of the person, and (ii) the second subset of pixels includes a first group of pixels that encompasses the first group of pixels of the first subset of pixels and a second group of pixels that encompasses the second group of pixels of the first subset of pixels.

2. The visor system of claim 1 the controller further configured to:
   select the operating mode for the visor based on at least one parameter previously stored in a memory.

3. The visor system of claim 1 the controller further configured to:
   receive, via a user interface, a selection for at least one parameter of the operating mode for the visor; and
   select the operating mode for the visor based on the selection for at least one parameter.

4. The visor system of claim 1, wherein the gradient of opacities defined by opacities of the second subset of pixels has decreased opacity with increased distance from at least one of (i) the first subset of pixels and (ii) the at least one position on the visor.

5. The visor system of claim 1, the controller further configured to, for each respective image in the plurality of images, for each respective pixel in the plurality of pixels:
   determine an updated pixel optical state for the respective pixel in the updated optical state for the visor based on a position of the respective pixel in the visor relative to the at least one position on the visor.

6. The visor system of claim 1, the controller further configured to, for each respective image in the plurality of images:
   determine an updated pixel optical state for at least one respective pixel in the plurality of pixels in the updated optical state for the visor based on a distance between (i) the at least one position on the visor and (ii) the position of at least one respective pixel in the visor.

7. The visor system of claim 1, the controller further configured to, for each respective image in the plurality of images:
   determine, based on the respective image, (i) a current position of the eye of the person and (ii) a current light direction at which the light source shines through the visor; and
   determine, based on the current position of the eye of the person and the current light direction, the at least one position on the visor at which the light source shines through the visor into the eye of the person.

8. The visor system of claim 7, the controller further configured to, for each respective image in the plurality of images:
  determine the at least one position on the visor at which the light source shines through the visor into the eye of the person by projecting the current position of the eye of the person onto the visor using the current light direction.

9. The visor system of claim 7, the controller further configured to, for each respective image in the plurality of images:
  determine, based on the respective image, a current position of a left eye of the person and a current position of a right eye of the person;
  determine a first position on the visor at which the light source shines through the visor into the left eye of the person by projecting the current position of the left eye of the person onto the visor using the current light direction; and
  determine a second position on the visor at which the light source shines through the visor into the right eye of the person by projecting the current position of the right eye of the person onto the visor using the current light direction.

10. The visor system of claim 1, wherein each respective pixel optical state in the plurality of pixel optical states is characterized by a numerical value that represents a respective opacity of the respective pixel optical state.

11. The visor system of claim 1, wherein the visor includes a liquid crystal display (LCD) panel and each pixel in the plurality of pixels is an LCD pixel.

* * * * *